(12) United States Patent
Rodney et al.

(10) Patent No.: US 9,022,145 B2
(45) Date of Patent: May 5, 2015

(54) VIBRATION DETECTION IN A DRILL STRING BASED ON MULTI-POSITIONED SENSORS

(75) Inventors: Paul F. Rodney, Spring, TX (US); Chenkang David Chen, Bellaire, TX (US); Carl A. Robbins, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 671 days.

(21) Appl. No.: 13/319,892

(22) PCT Filed: May 27, 2010
(Under 37 CFR 1.47)

(86) PCT No.: PCT/US2010/036409
§ 371 (c)(1),
(2), (4) Date: Mar. 28, 2012

(87) PCT Pub. No.: WO2010/138718
PCT Pub. Date: Dec. 2, 2010

(65) Prior Publication Data
US 2012/0222900 A1    Sep. 6, 2012

Related U.S. Application Data

(60) Provisional application No. 61/181,385, filed on May 27, 2009.

(51) Int. Cl.
*E21B 7/24* (2006.01)
*E21B 44/00* (2006.01)

(52) U.S. Cl.
CPC ...................... *E21B 44/00* (2013.01)

(58) Field of Classification Search
CPC ..................................................... E21B 28/00
USPC .................. 73/152.47, 152.16; 706/6; 175/56
See application file for complete search history.

(56) References Cited

U.S. PATENT DOCUMENTS

| 5,864,058 A | 1/1999 | Chen |
| 2002/0120401 A1 | 8/2002 | Macdonald et al. |

(Continued)

FOREIGN PATENT DOCUMENTS

| GB | 2275283 | 8/1994 |
| GB | 2299415 | 10/1996 |

(Continued)

OTHER PUBLICATIONS

"Australian Application Serial No. 2010254012, Amendment and Response filed Oct. 17, 2012", 6 pgs.

(Continued)

*Primary Examiner* — David Andrews
*Assistant Examiner* — Ronald Runyan
(74) *Attorney, Agent, or Firm* — Schwegman Lundberg & Woessner, P.A.; Anthony Iannitelli

(57) ABSTRACT

In some example embodiments, a system includes a drill string having a drill bit. The drill string extends through at least part of a well bore. The system also includes a first vibrational sensor, positioned on the drill bit to measure, at a first location on the drill string, an amplitude of one or more of an axial vibration and a lateral vibration. The system also includes a second vibrational sensor, positioned above the drill bit and on the drill string. The second vibration sensor is to measure, at a second location on the drill string, one or more of an axial vibration and a lateral vibration. The system includes a processor unit to determine a type of vibration based on a comparison of the amplitude at the first location to the amplitude at the second location, wherein the type of vibration is at least one of bit whirl of the drill bit and a while of a bottom hole assembly that is part of the drill string.

18 Claims, 10 Drawing Sheets

(56) References Cited

U.S. PATENT DOCUMENTS

| | | |
|---|---|---|
| 2005/0060096 A1 | 3/2005 | Hutchinson |
| 2006/0106541 A1 | 5/2006 | Hassan et al. |
| 2006/0185430 A1 | 8/2006 | Yogeswaren |

FOREIGN PATENT DOCUMENTS

| | | |
|---|---|---|
| WO | WO-2006106541 A1 | 5/2006 |
| WO | WO-2006185430 A1 | 8/2006 |
| WO | WO-2010138718 A1 | 12/2010 |

OTHER PUBLICATIONS

"Australian Application Serial No. 2010254012, First Examiner Report mailed Aug. 31, 2012", 3 pgs.

"European Application Serial No. 10781214.1, Office Action mailed Dec. 19, 2011", 2 pgs.

"International Application Serial No. PCT/2010/036409, Int'l Preliminary Report on Patentability mailed Dec. 8, 2011", 8 pgs.

"Australian Application No. 2010254012, Response filed Sep. 27, 2012 to Office Action mailed Aug. 31, 2012", 11 pgs.

Pavone, D. R., et al., "Application of High Sampling Rate Downhole Measurements for Analysis and Cure of Stick-Slip in Drilling", *SPE 28324—SPE 69th Annual Technical Conference and Exhibition* (Sep. 25-28, 1994, New Orleans, LA), (1994), 335-345.

"International Application Serial No. PCT/US2010/36409, Search Report mailed Jul. 28, 2010", 4 Pgs.

"International Application Serial No. PCT/US2010/36409, Written Opinion mailed Jul. 28, 2010", 8 pgs.

Dufeyte, M P, et al., "Detection and monitoring of the slip-stick motion: field experiments", Proc Drill Conf, SPE 21945, (1991), 429-438.

Heisig, G, et al., "Downhole diagnosis of drilling dynamics data provides new level drilling", Proceedings—SPE Annual Technical Conference and Exhibition, v Delta, Drilling and Completion, SPE 49206, (1998), 649-658.

Pavone, D R, et al., "Application of High Sampling Rate Downhole Measurements for", SPE 69th Annual Technical Conference and Exhibition held in New Orleans, SPE 28324, (Sep. 25?28, 1994).

Robnett, E W, et al., "Analysis of the stick-slip phenomenon using downhole drillstring rotation data", Proceedings of the IADC/SPE Asia Pacific Drilling Technology Conference, APDT, v 2, SPE/IADC 52821, (1999), 33-44.

Warren, T M, et al., "Torsional resonance of drill collars with PDC bits in hard rock", Proceedings—SPE Annual Technical Conference and Exhibition, v Delta, Drilling and Completion, SPE 49204, (1998), 625-637.

VIBRATION DETECTION IN A DRILL STRING BASED ON MULTI-POSITIONED SENSORS

RELATED APPLICATIONS

This application is a U.S. National Stage Filing under 35 U.S.C. 371 from International Application No. PCT/US2010/036409, filed May 27, 2010, and published as WO 2010/138718 A1 on Dec. 2, 2010, which claims priority under 35 U.S.C. 119(e) to U.S. Provisional Patent Application Ser. No. 61/181,385, filed May 27, 2009; which applications and publication are incorporated herein by reference in their entirety.

TECHNICAL FIELD

The application relates generally to hydrocarbon recovery operations. In particular, the application relates to a configuration for vibration detection in a drill string using multi-positioned sensors along the drill string.

BACKGROUND

During drilling operations, vibrations within a drill string can be related to a number of drilling problems. If there are large vibrations, one or more components in the drill string, the drill bit, drill collar, etc. may be prematurely worn or broken. Moreover, the drilling performance can be decreased. The types of vibrations on a drill string can include longitudinal or axial vibration, torsional vibration, and lateral vibration. While these vibrational modes (including combinations of the vibration types) can be destructive downhole, or can be indicative of conditions that would be desirable to be known by those conducting the drilling operations, they can be very difficult to determine at the surface. Additionally, in order to facilitate corrective action, determining the operational mode of the drill string in as close to real time as possible would be helpful in avoiding the possible detrimental results.

BRIEF DESCRIPTION OF THE DRAWINGS

Embodiments of the invention may be best understood by referring to the following description and accompanying drawings which illustrate such embodiments. The numbering scheme for the Figures included herein are such that the leading number for a given reference number in a Figure is associated with the number of the Figure. For example, a tool 100 can be located in FIG. 1. However, reference numbers are the same for those elements that are the same across different Figures. In the drawings.

DETAILED DESCRIPTION

Methods, apparatus and systems for vibration detection in a drill string using multi-positioned sensors, sensors at spaced locations, along the drill string are described. In the following description, numerous specific details are set forth. However, it is understood that embodiments of the invention may be practiced without these specific details. In other instances, well-known circuits, structures and techniques have not been shown in detail in order not to obscure the understanding of this description.

System Operating Environment

Figure 1:
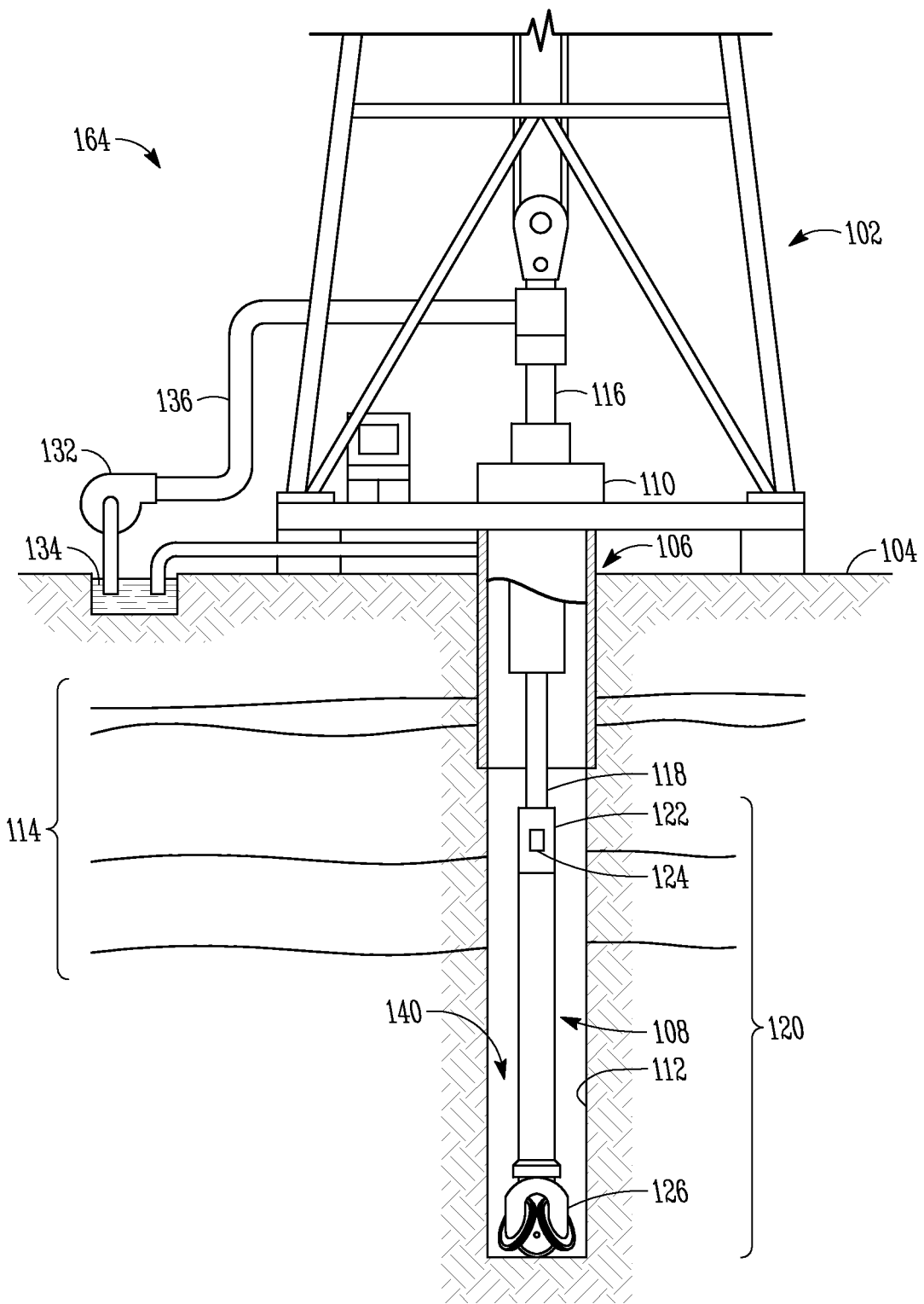
FIG. 1 illustrates a drilling well during Measurement While Drilling (MWD) operations that includes a drill string having multi-located sensors for detecting vibrations, according to some example embodiments.

An example system operating environment for a vibration analysis system is described. FIG. 1 illustrates a well during Measurement While Drilling (MWD) operations; wherein the well 106 includes a drill string 108 having multiple sensors for detecting vibrations, according to some example embodiments described herein. It can be seen that surface system 164 includes a portion of a drilling rig 102 located at the surface 104 of the well 106. The drilling rig 102 provides support for the drill string 108. The drill string 108 can operate to penetrate a rotary table 110 used to rotate the drill string and to thus drill a borehole 112 through subsurface formations 114. The drill string 108 will often include a Kelly 116, drill pipe 118, and a bottom hole assembly 120 coupled at the lower portion of the drill pipe 118.

In some example embodiments, the bottom hole assembly 120 includes one or more drill collars 122, a downhole logging tool 124, and a drill bit 126. The drill bit 126 can operate to create a borehole 112 by penetrating the surface 104 and subsurface formations 114. The downhole tool 124 can comprise any of a number of different types of tools including MWD (measurement while drilling) tools, LWD tools, and others. In some example embodiments, the logging tool 124 will contain processing capability and circuitry for receiving measurements from the described sensors, and evaluating the measurements downhole. Where such downhole processing is performed, the results may be communicated to the surface through conventional data transmission systems known in the art, and the measurement data and the analysis thereof will, in some examples, also be retained in memory in the tool for later review, if needed. As further described below, in some example embodiments, different types of vibrational sensors are positioned at different locations along the drill string to determine a type of vibration mechanism (e.g., axial, torsional, lateral, etc.) and the location of the vibration (e.g., drill bit, bottom hole assembly, etc.).

As noted above, during drilling operations the drill string 108 (typically including the Kelly 116, the drill pipe 118, and the bottom hole assembly 120) can be rotated by the rotary table 110. In addition to, or alternatively, the bottom hole assembly 120, or some portion thereof, can also be rotated by a motor (e.g., a mud motor) that is located downhole. The drill collars 122 can be used to add weight to the drill bit 126. The drill collars 122 can also operate to stiffen the bottom hole assembly 120, allowing the bottom hole assembly 120 to transfer the added weight to the drill bit 126, and in turn, to assist the drill bit 126 in penetrating the surface 104 and subsurface formations 114.

During drilling operations, a mud pump 132 can pump drilling fluid (sometimes known by those of skill in the art as "drilling mud") from a mud pit 134 through a hose 136 into the drill pipe 118 and down to the drill bit 126. The drilling fluid flows out from the drill bit 126 and is returned to the surface 104 through an annular area 140 between the drill pipe 118 and the sides of the borehole 112. The drilling fluid is then be returned to the mud pit 134, where such fluid is filtered. Typically, the drilling fluid is used to cool the drill bit 126, as well as to provide lubrication for the drill bit 126 during drilling operations. Additionally, the circulation of the drilling fluid is used to remove subsurface formation 114 cuttings created by operating the drill bit 126.

Configurations for Positioning of Sensors Along a Drill String

Figure 2:
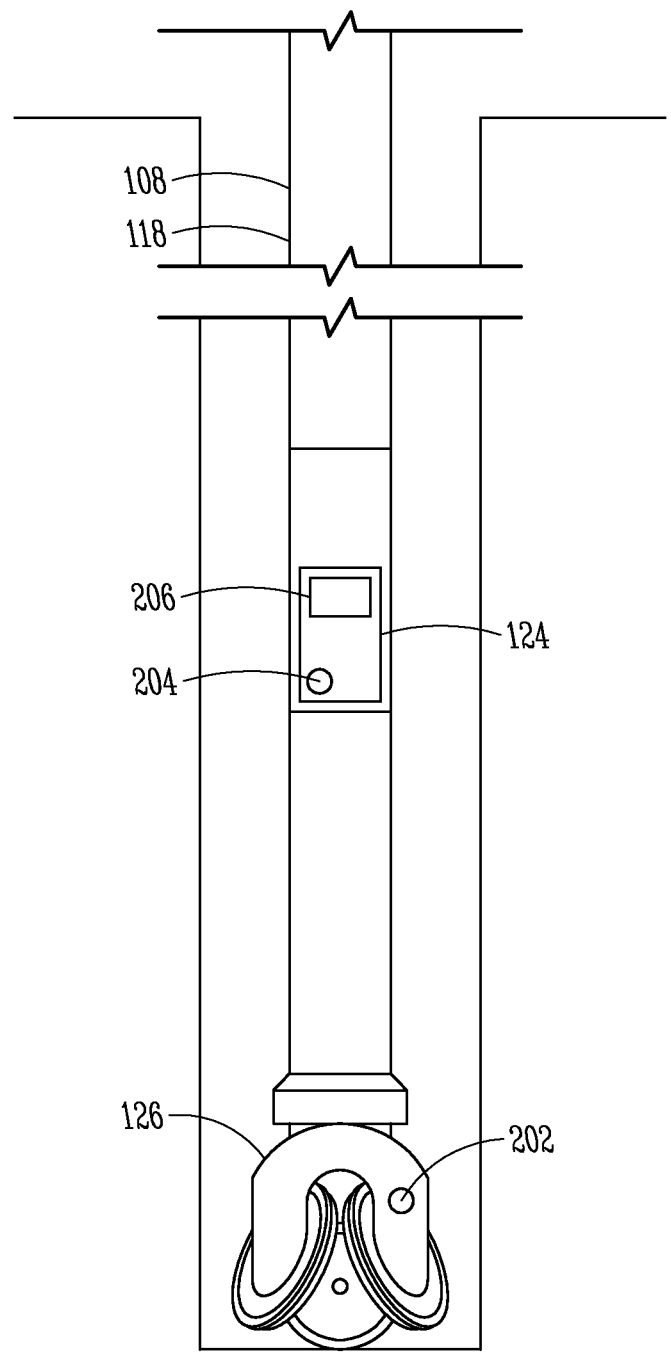
FIG. 2 illustrates part of a drill string having multi-located sensors along the drill string for vibration detection along the drill string, according to some example embodiments.

FIG. 2 illustrates part of a drill string having multi-located sensors along the drill string for vibration detection along the drill string, according to some example embodiments. In particular, FIG. 2 illustrates parts of the drill string 108. The drill string 108 includes the drill pipe 118 that is coupled to the bottom hole assembly 120. The drill bit 126 is coupled in bottom hole assembly 120 through a threaded connection. A first vibrational sensor 202 is positioned at (in) or near the drill bit 126. In some embodiments, more than one vibrational sensor 202 may be positioned at or near the drill bit 126. A second vibrational sensor 204 is then positioned at another location in the drill string, such as, in this example embodiment, toward the top of the bottom hole assembly 120. In some embodiments, more than one vibrational sensor 204 may be positioned at or near the bottom hole assembly 120. In some embodiments, the vibrational sensor 202 and the vibrational sensor 204 can be different types of transducers. Additionally, in some cases it may be desired to place additional sensors in the drill string, for example, in or near components of interest, such as a mud motor, when present in the drill string. In many embodiments, the vibrational sensors 202 and 204 will each be multi-axial sensors, preferably tri-axial accelerometers. As noted above, the downhole logging tool 124 in the bottom hole assembly 120 can include a processor unit, which in this example, will be used to process signals from the vibrational sensors downhole, thereby facilitating evaluation of downhole conditions essentially in real time (allowing time primarily for communication of measurement signals from the sensors to the processor unit, (implemented in part in either hardware or software), and the evaluation of those signals). As will be apparent from the discussion herein, by comparing the measured vibrations on (or near) the drill bit, with the monitored vibrations further up the drill string (such as near the top of the BHA, in this example), one can evaluate the operational conditions of the drill string.

As further described below, in some embodiments, the vibrational sensor 202 and the vibrational sensor 204 each measure or monitor amplitudes of one or more of lateral vibration, longitudinal vibration, and torsional vibration. The vibrational sensor 202 and the vibrational sensor 204 can each be representative of one or more different types of measurement devices. For example, in some example embodiments, the vibrational sensor 202 and the vibrational sensor 204 will each include one or more accelerometers; and as the accelerometers will preferably be oriented to measure lateral motion (e.g., X and Y directions transverse to the axis of the drill string) and longitudinal vibration (e.g., Z direction along the axis of the drill string), the accelerometers will preferably be tri-axial accelerometers. Alternatively or in addition, either (or both) of vibrational sensors 202 and 204 can also include a magnetometer or a Hall effect device to determine rotations of the drill bit or drill string. Such devices can be used to determine torsional vibration, as well as many other operating conditions, as set forth below.

Example Borehole Conditions

For purposes of illustration of the concepts herein, relative terms of "low," "medium" and "high" acceleration measurements are used herein. Such terms are not intended to reflect any specific values, as the quantitative measurements will be recognized to those skilled in the art to be variable depending on the drill string utilized and the components therein (for example, the sensors used, and the systems used in the drill string to mitigate transfer of shock and vibration through the drill string). For example, in terms of actual forces experienced, in many operational situations, with smooth drilling, the axial acceleration on the drill string is generally on the order of 0.1 g; but it can exceed 100 g for short time intervals (for example, a few milliseconds) in rough drilling conditions; and the lateral shock can exceed 1,000 g in rough drilling conditions. Hence, in absolute forces, low vibration might be characterized, for example, by a mean vibration axial vibration level less than about 0.1 g with peaks on the order of 1 g for a few ms, and cross-axial vibration less than about 1 g with peaks no larger than 10 g. Similarly, high vibration might be characterized, for example, as a vibration in which either the axial vibration exceeds 1 g on average, it has peak accelerations exceeding 100 g, (for example, for 1 or more times per second), or the lateral vibration exceeds 10 g on average or the lateral vibration has peaks exceeding a few hundred g one or more times per second. Medium level vibration could then, in this example, be characterized by anything between those two states. For clarity, however, the above examples are only examples, and are representative only of absolute forces; and thus actual measured vibration forces in any tool string may be substantially different from the example values, depending on the measurement system and the drill string characteristics, as discussed above.

As noted above, the measured axial, torsional, and/or lateral vibrations can determine different conditions downhole relative to the drill string operation. For example, an axial motion of a given magnitude can be indicative of bit bounce of the drill bit. Large weight on bit fluctuations can cause the drill bit to repeatedly lift-off and then impact the formation. For bit bounce, the indicative responses of the vibrational sensors 202 and 204 include high peak acceleration in the Z direction from both sensors. When comparison of the vibrational sensor measurements from both sensors indicates high peak acceleration along the Z axis, and thus indicates a bit bounce operational mode, the driller may than use that determination to change one or more drilling parameters (such a weight on bit, speed of rotation, etc.) to correct the undesired operational mode.

Another downhole condition of concern is "stick slip." Stick slip is a non-uniform drill bit rotation in which the drill bit stops rotating momentarily at regular intervals causing the drill sting to periodically torque up and then spin free. When stick slip occurs, the average RPM signal may be generally uniform, but the instantaneous RPM signal may range from nearly 0 RPM to several multiples of the average RPM signal. A torsional motion of a given magnitude can be indicative of stick slip; and thus can be identified by comparison of the acceleration measurements from the spaced sensors. As a result of the motion characteristics during conditions of stick slip, indicative measurements of the vibrational sensors can include low to medium peak X and Y accelerations. For example, the above-described changes in instantaneous RPM will often reflected in an "extremely small" measured acceleration for some significant period of time (such as over the time period of a few revolutions), followed by a significantly increased measured acceleration as the string breaks free. The relative values of these acceleration measurements can be established relative to any desired reference, for example, the standard deviation typical of a drilling operation, as represented (by way of example only): by stand-alone calibrations of the sensors; by empirical or historical reference data (which in some cases may be tailored to specific drill string configurations or types of configurations); or by calibration measurements taken with the drill string in question, as just three examples. As another example, the measured acceleration measurements may be compared to reference measurements from vibrational sensors in the drill string at a location where sticking would not be expected, such as the portion of the well above the bottom hole assembly. When these values are evaluated relative to such reference values (such as observed outputs of the same or comparable X- and Y-sensors under known normal drilling conditions), then comparison to the known reference can be according to any desired relation to the reference values. On desirable such relation is to the standard deviation of the reference measurement(s). For example, in an example comparison, "extremely small" might mean less than some fraction of the standard deviation of the reference (e.g., for example 0.25 standard deviations). Typically in evaluating stick slip, the condition of an "extremely small" measured acceleration measurement must prevail for a significant portion of the expected rotational period (as e.g., at least 0.25 of a rotational period). The above-referenced observation of "low to medium peak X and Y accelerations" results from the fact that when the bit breaks free, normal drilling takes place, and the heavy side slap observed in some of the other types of motion, such as in chaotic whirl, will not typically be observed with stick-slip. Additionally, the acceleration measurements from the spaced sensors will be compared to one another, and in cases where the sensors are sufficiently spaced as to not be uniformly impacted by the sticking forces, the acceleration measurements will often be of different frequency and phase. Again, and as with the undesired operational modes as described below, comparison of the sensor signals to each other, and preferably also to a reference, allows identification of the system operational mode in essentially real time, and facilitates the driller taking corrective action. In the case of a whirl condition, that corrective action will often include reducing the surface RPM of the drill string.

Another downhole condition of interest is drill bit whirl. Drill bit whirl includes an eccentric rotation of the bit about a point other than its geometric center, typically caused by the bit or by wellbore gearing. Bit whirl induces high frequency lateral vibration of the bit and the drill string. Without the use of analytical techniques as described herein, bit whirl can be very difficult to detect at the surface by the drilling operators. Bit whirl can cause many forms of deleterious conditions, including bit cutter impact damage, over-gauge forming of the borehole, bottom hole assembly connection failures, and MWD component failures. For bit whirl, the indicative responses of the vibrational sensors can include high peak X and Y accelerations, while the average X and average Y accelerations are about equal. High peak X and Y accelerations may be indicative of bit whirl because the motion tends to cause the bit to slam against the borehole wall. The average acceleration, however, may not appear to be too high as the peak values are from impulsive events. No asymmetry is expected in the X- and Y-values over a period of a few seconds, and thus average X and average Y acceleration measurements that are about equal signifies that, other than the impulsive events, the performance appears to be normal drilling operations. Where one or both of the vibrational sensors 202, 204 includes a magnetometer or other rotationally sensitive device, chaotic drill bit whirl will be characterized by frequencies significantly above the measured rotational frequency. Additionally, the onset of such chaotic drill but whirl can be observed by the frequencies of the acceleration measurements tending to increase in a sequence of doubling, tripling, and doubling or tripling again, and ultimately reaching chaos. Comparison of the measurements from the two sensors further assists in evaluating the location of the whirl and thus the actual operational mode, for example, distinguishing between drill bit whirl and BHA whirl, as discussed below.

Another downhole condition of interest is Bottom Hole Assembly (BHA) whirl. BHA whirl typically includes the BHA gearing around the borehole and results in several lateral shocks between the bottom hole assembly and the well bore. BHA whirl can be a major cause of many drill string and MWD component failures. BHA whirl can occur while rotating/reaming off-bottom and can also be very difficult to detect at the surface. Bottom hole assembly whirl can cause different MWD component failures (e.g., motor, MWD tool, etc.), localized tool joint and/or stabilizer wear, washouts or twist-offs due to connection fatigue cracks, increased average torque, etc.

Lateral shocks can also occur during the drilling operation. Lateral shocks can be caused the bottom hole assembly moving sideways, or in some cases whirling forward and backwards randomly. Lateral shocks of the bottom hole assembly (BHA) can be induced either from drill bit whirl or from rotating an unbalanced drill string. Similar to whirl, without the use of example techniques as described herein, lateral shocks can be very difficult to detect at the surface. Such non-steady-state motion may often be recognized from data indicating medium or high peak lateral accelerations but low average accelerations of the vibration. Lateral shocks have also been linked to different MWD and downhole tool connection failures. Lateral shocks can cause different MWD component failures (e.g., motor, MWD tool, etc.), localized tool joint and/or stabilizer wear, washouts or twist-offs due to connection fatigue cracks, increased average torque, etc. For lateral shocks, the responses of the vibrational sensors can include medium to high peak X or Y accelerations. In some example embodiments, peak X and Y are about equal. In some situations, there are no dominant peaks in the frequency plots of the burst data. Lateral shock can be largely defined by medium to high peak accelerations on either axis. One indication of many forms of drill string resonant condition is repeated shocks in a given direction. The direction may not correspond to an X- or Y-axis acceleration, but rather the peak X- and Y-accelerations occur simultaneously or in very close time proximity to one another (such as, on the order of milliseconds) and have some generally fixed ratio, or remain within a fixed bound, with respect to each other. While the ratio relationship of the acceleration measurements may be defined by persons of skill in the art having the benefit of the present disclosure, one possible example definition as follows: for a time interval of about 10 seconds, $$\frac{(\text{avg.\_of\_max\_}Y * \text{std.\_deviation\_of\_}X) + (\text{avg.\_of\_max\_}X * \text{std. deviation\_of\_}Y)}{(\text{avg.\_of\_max\_}X)^2 + (\text{avg.\_of\_max\_}Y)^2} \qquad \text{Eq. 1}$$

In some operations, there is a vibration modal coupling involving all three motions (axial, torsional, and lateral vibrations). Such coupling can create axial and torque oscillations and high lateral shocks of the BHA. Vibration modal coupling can cause various of the previously-described operational problems, including different MWD component failures (e.g., motor, MWD tool, etc.), bit cutter impact damage, collar and stabilizer wear, washouts or twist-offs due to connection fatigue cracks, etc. For vibration modal coupling, as with indicia of lateral shock, the representative responses of the vibrational sensors can include high peak X, Y and Z accelerations, accompanied by low to medium average X and Y accelerations. In many cases of such modal vibration coupling, the above indicia will be accompanied by discernible frequency patterns in the measurements.

In some example embodiments, a processor unit within the downhole tool and/or at the surface receives the vibration measurements from the vibration sensors 202 and 204. The processor unit is configured to determine a type of vibrational mode, and thus a drill string condition, based on a comparison of the measurement at the first location to the measurement at the second location, and in many cases in further reference to a reference value, as discussed above. An amplitude-based evaluation will be adequate for some evaluations, and thus in some example embodiments, the frequency response is not required for the evaluation. For example, large amplitude vibrations are dangerous, whether they are random or have some well-defined frequency content. And thus the techniques described herein may be of substantial value in identifying some operational modes without substantial consideration of the frequency content of the measurements. However, for some operational modes, such as drill string resonance and bit whirl, better identification of the operational mode can be obtained through use of a combination of amplitude and frequency. That identification of the operational mode (i.e., the cause of the vibration), makes it possible for the driller to take appropriate actions to remove the cause, so as to return to "normal" drilling operation modes.

Figure 3:
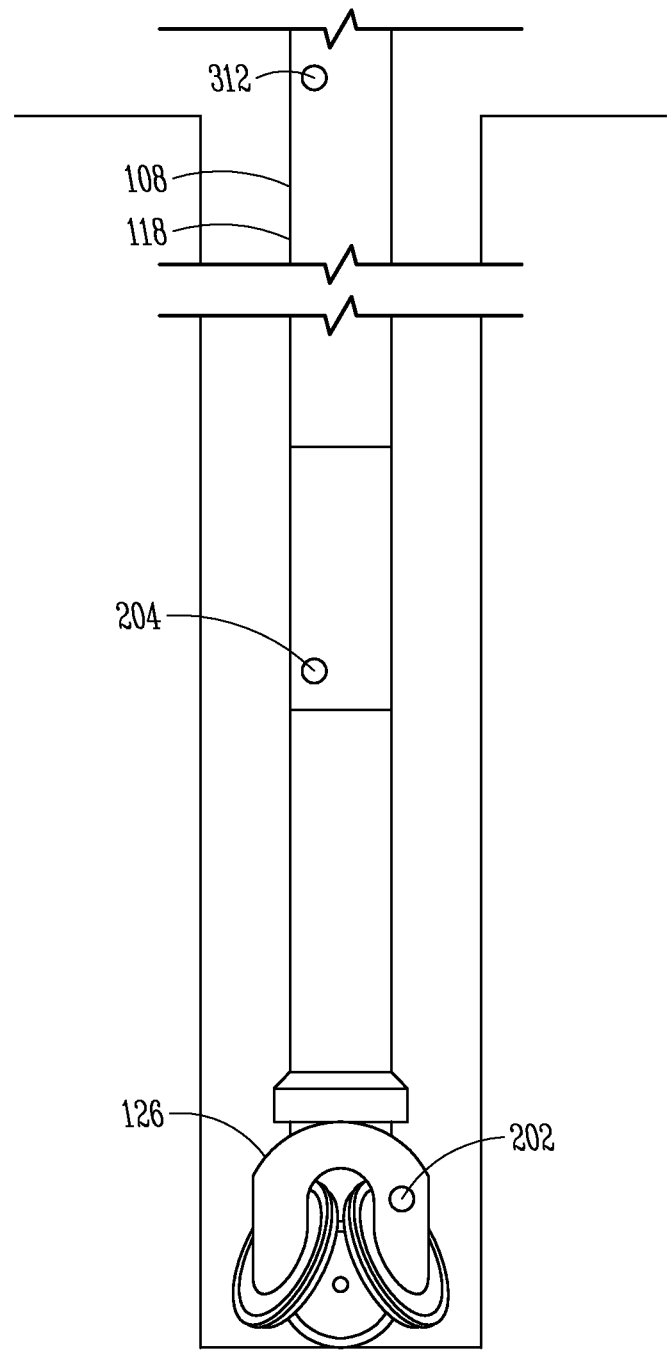
FIG. 3 illustrates part of a drill string having multi-located sensors along the drill string for vibration detection along the drill string, according to some other example embodiments.

FIG. 3 illustrates part of a drill string having multiple sensors along the drill string for vibration detection along the drill string, according to some other example embodiments. In particular, FIG. 3 illustrates parts of the drill string 108, including the drill pipe 118 that is coupled to the bottom hole assembly 120. The bottom hole assembly 120 is coupled to a drill bit 126 through a threaded connection. A vibrational sensor 202 is positioned at or near the drill bit 126. In some embodiments, more than one vibrational sensor 202 may be positioned at or near the drill bit 126. A vibrational sensor 204 is positioned at or near the bottom hole assembly 120. In some embodiments, more than one vibrational sensor 204 may be positioned at or near the bottom hole assembly 120. Additionally, a vibrational sensor 312 may be positioned on the drill string at or near the surface. In some embodiments, the vibrational sensor 202, the vibrational sensor 204 and the vibrational sensor 312 can be different types of transducers. Although, as noted above, the vibrational sensors 202, 204 and 312 can each desirably be a tri-axial accelerometer. The logging tool in the bottom hole assembly 120 can include a processor unit.

Example embodiments are not limited to the configurations illustrated in FIGS. 2-3. In another example, the drill string could include a vibrational sensor at the bottom hole assembly and a vibrational sensor at or near the surface. In another example, the drill string could include a vibrational sensor at or near the drill bit and at or near the surface. In another example, additional sensors can be positioned at other locations along the drill string (e.g., between the BHA and the drill bit, between the BHA and the surface, etc.).

Example embodiments include a detection of vibration through use of multiple vibration sensors placed in and along the drill string. Vibrational sensors to sense lateral vibration may be placed near the drill bit and away from the drill bit. By comparing the lateral vibration near the drill bit to the lateral vibration data away from the drill bit, embodiments as described herein may be used to detect a vibrational mode in the drill string, and to evaluate that vibrational mode to, as just one example, differentiate drill bit whirl from BHA whirl. The multiple sensors may also be useful to obtain vibration data at critical components along the drill string, and thus to evaluate conditions, such a potential failure conditions, for such components.

Operations for Detection of Vibration Mechanisms

This section describes operations performed in accordance with some embodiments of the invention. In certain embodiments, the operations are performed by using one or more processors in the processor unit to execute instructions residing on machine-readable media (e.g., software); while in other embodiments, the methods are performed by hardware or other logic (e.g., digital logic). The system operations are described relative performing such operations downhole. However, in some embodiments, some or all of these operations may be performed at the surface.

Figure 4:
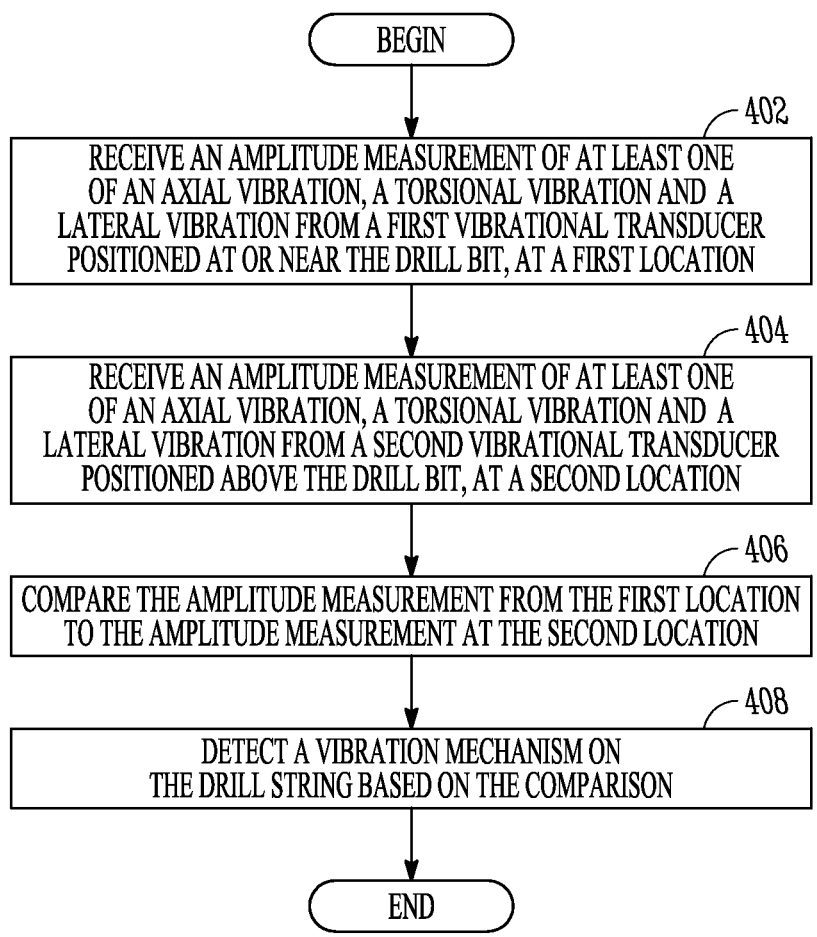
FIG. 4 illustrates a flow diagram for operations for detection of a vibration mechanism in a drill string, according to some example embodiments.

FIG. 4 illustrates a flow diagram for operations for detection of a vibration mechanism in a drill string, according to some example embodiments. FIG. 4 illustrates operations that may be executed by the processor unit in the downhole tool and/or at the surface.

At block 402, an amplitude measurement of at least one of an axial vibration, a torsional vibration and a lateral vibration (and preferably, for many systems, all 3 measurements) is received from a first vibrational transducer positioned at or near the drill bit, which is at a first location on the drill string. The processor unit receives the amplitude measurement from the vibrational sensor 202. Thus, the vibrational sensor 202 can measure an amplitude for one, some or all of an axial vibration, a torsional vibration and a lateral vibration. For example, the vibrational sensor 202 is preferably a tri-axial vibrational sensor 202 (such as an accelerometer) that measures lateral, axial, and torsional vibration. The first vibrational sensor 202 transmits the amplitude measurements to the processor unit using any of a number of different types of communications. For example, the first vibrational sensor 202 can be wired or otherwise operably coupled to communicate measurement signals to the processor unit or to components (buffers, etc.) associated therewith. Such other communication may be based on electromagnetic wireless communication, fiber optic communication, mud pulse communication, etc. The flow continues at block 404.

At block 404, an amplitude measurement of at least one of an axial vibration, a torsional vibration and a lateral vibration is received from a second vibrational transducer positioned above the drill bit, which is at a second location on the drill string. The processor unit 206 receives the amplitude measurement from the vibrational sensor 204. Thus, the vibrational sensor 204 can be at or near the bottom hole assembly. In some embodiments, this second vibrational sensor can be closer or further away from the drill bit. In some embodiments, this second vibrational sensor can be at or near the surface. In some embodiments, the distance from the first vibrational sensor and the second vibrational sensor is at least a distance X, where the distance X can be between 100-200 feet, between 50-100 feet, between 10-200 feet, etc. The flow continues at block 406.

At block 406, the amplitude measurement from the first location is compared to the amplitude measurement from the second location on the drill string. In many examples, the measurement signals will be of acceleration, and at least a portion of the comparison will be based on the frequency characteristics of the signals from the spaced locations. The processor unit 206 performs this operation. The flow continues at block 408.

At block 408, a vibration mechanism on the drill string is detected based on the comparison of the vibrations at the two different locations on the drill string. The processor unit can detect the vibration mechanism. In some example embodiments, the detection is based on the severity of the vibrations. In some example embodiments, the processor unit can analyze the acceleration of the vibrations in the X, Y and Z directions. In some cases, the processor unit can evaluate the vibrational measurements relative to some reference, either in terms of reference measurement values or thresholds, or by grouping (categorizing) the acceleration measurements (both average and peak acceleration of the vibrations) into low, medium and high bands (appropriate for the drill string configuration, as described earlier herein), for analysis.

For purposes of illustration, and not of limitation, in some example embodiments, example ranges for evaluating sensor vibrational measurements might be: for average acceleration for X or Y axes, a low range of 0-3 g, a medium range of 3-6 g and a high range of greater than 6 g; and for average acceleration for the Z axis, a low range of 0-2 g, a medium range of 2-4 g and a high range of greater than 4 g. Alternatively, in other example systems, different ranges might be used, for example, for average acceleration for X-Y axes, a low range of 0-1 g, a medium range of 1-2 g and a high range of greater than 2 g, with corresponding adjustments to measurements on the Z axis. In such example embodiments, ranges for peak acceleration measurements could be attributed as follows: for the X and Y axes, a low range of 0-30 g, a medium range of 30-90 g and a high range of greater than 90 g; and for the Z axis, a low range of 0-15 g, a medium range of 15-40 g and a high range of greater than 40 g.

Other Configurations

This section describes other configurations and operations performed in accordance with some embodiments. In certain embodiments, the operations are performed by a processor executing instructions residing on machine-readable media (e.g., software), while in other embodiments, the methods are performed by hardware or other logic (e.g., digital logic). The system operations are described relative performing such operations downhole. However, in some embodiments, some or all of these operations may be performed at the surface.

Some example embodiments include a method for a real time frequency analysis of the vibration modes in the drill string to detect drill bit whirl and torsional resonance. In some example embodiments, vibration frequency and magnitude information are first obtained downhole by Fast Fourier Transform (FFT) and relayed to the surface. Embodiments may differentiate among bit whirl vibration, Bottom Hole Assembly (BHA) vibration and lateral shock vibration.

For bit whirl vibration, the vibration frequency is equal to the number blades and cones on the bit, multiplied by the downhole Rotations Per Minute (RPMs) of the drill string. Thus, if the vibration frequency is a multiple of the downhole RPM frequency, the vibration is most likely due to bit whirl. If the vibration frequency is not such a multiple, such vibration is most likely a bottom hole assembly (BHA) vibration. If there are multiple frequencies with similar magnitude rather than one dominant frequency mode, the vibration is most likely due to lateral shocks from sources such as the motor or stabilizer.

Some example embodiments include a method for detecting stick slip using time-domain and/or frequency domain analyses from downhole measurements. In some example embodiments, this analysis involves measuring the variation in RPM, such as may be determined using the angular position of the downhole tool. The angular position and the RPM can be determined using a downhole sensor (such as a magnetometer) which provides an angular indication relative to magnetic north. In some example embodiments, stick-slip can be detected from the magnitude and frequency spectrum of the RPM measurement. In a variation of the embodiment, the stick slip frequency measurement of the down-hole sensor can be compared to a surface measurement to determine if the stuck point is other than the drill bit. In some example embodiments, an accelerometer can be used to detect variation in RPM.

In particular, stick slip is based on sensing tool rotation and on sensing tool rotation and variations in the rotary speed resulting from binding in the BHA. This binding causes the tool to slow down as the tool binds and to speed up as the tool releases. The average rotary speed is consistent but the actual instantaneous RPM varies from nearly zero to several times the average rotary speed. By measuring the magnitude of the RPM variation and its frequency, an indication of the stick slip condition can be provided to alert the surface operators that modification of the drilling operations is needed.

Figure 5:
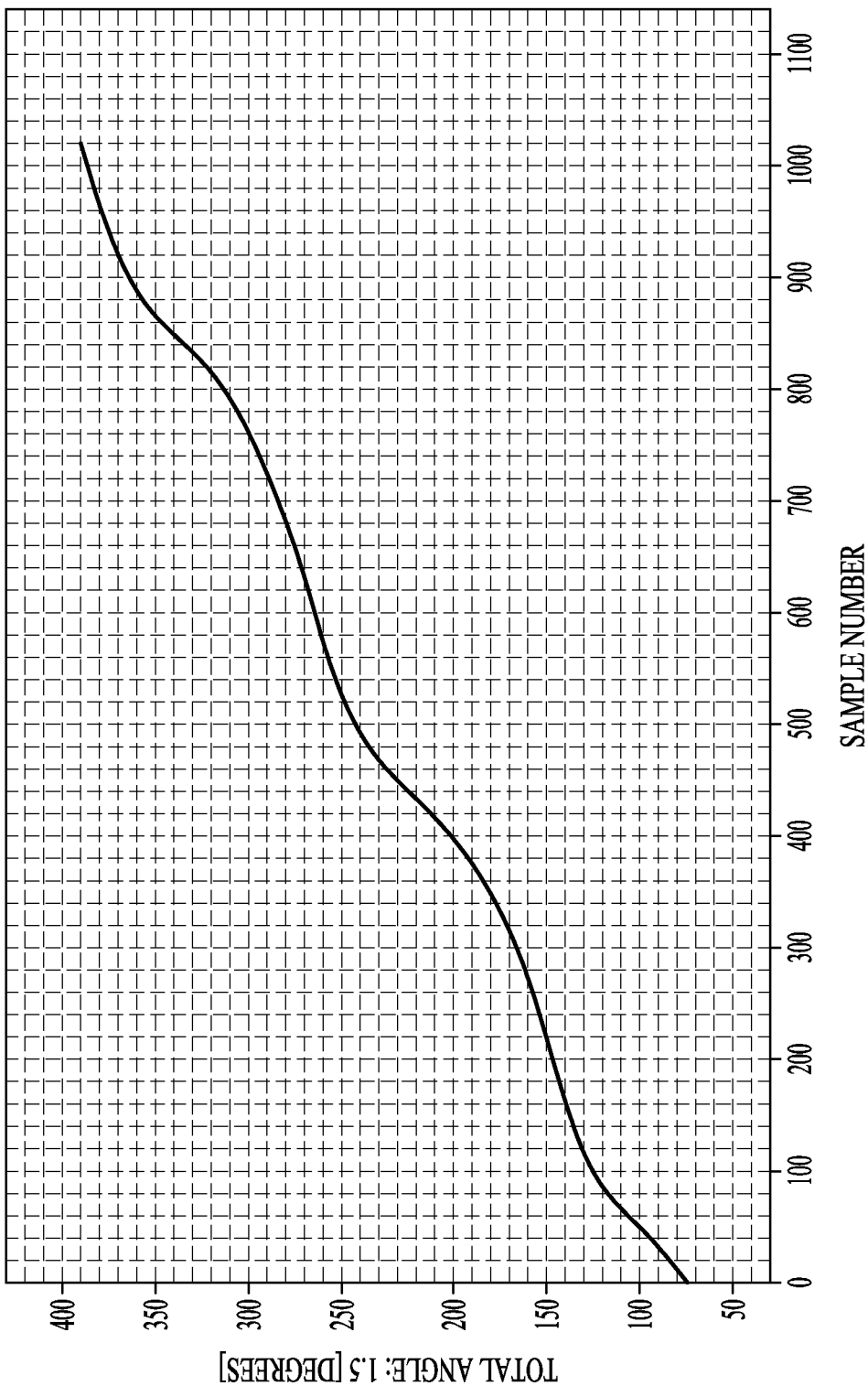
FIG. 5 illustrates a graph of the angular change of the tool, according to example embodiments.

A magnetometer or similar device is used to measure the tool angular position in the borehole. This angular position is referenced to some arbitrary zero position such as magnetic north or gravity high side. This angle will increase as the tool rotates in the borehole during drilling. FIG. 5 illustrates a graph of the angular change of the tool, according to some example embodiments. This graph illustrates a simulated angle measurement in a stick slip condition at an average of 30 RPM. The horizontal axis is the sample number for an angle sampled at a 400 sample/second rate. The vertical axis is a measure of the total angle, where the indicated integer value is the actual angle divided by 1.5. The plot indicates that from sample 0 to 800, the angle changes from 75 to 315 for the angle (a change of 240 (360 degrees or 1 revolution)). This is the correct total angular change for 2 seconds of data at 30 RPM. As seen, there is a sinusoidal appearance of the angle and this is the stick slip value to be measured. The slope of the plot is an indication of the average RPM (or angular speed) and the deviation from this straight line is the stick slip oscillation to be measured.

Figure 6:
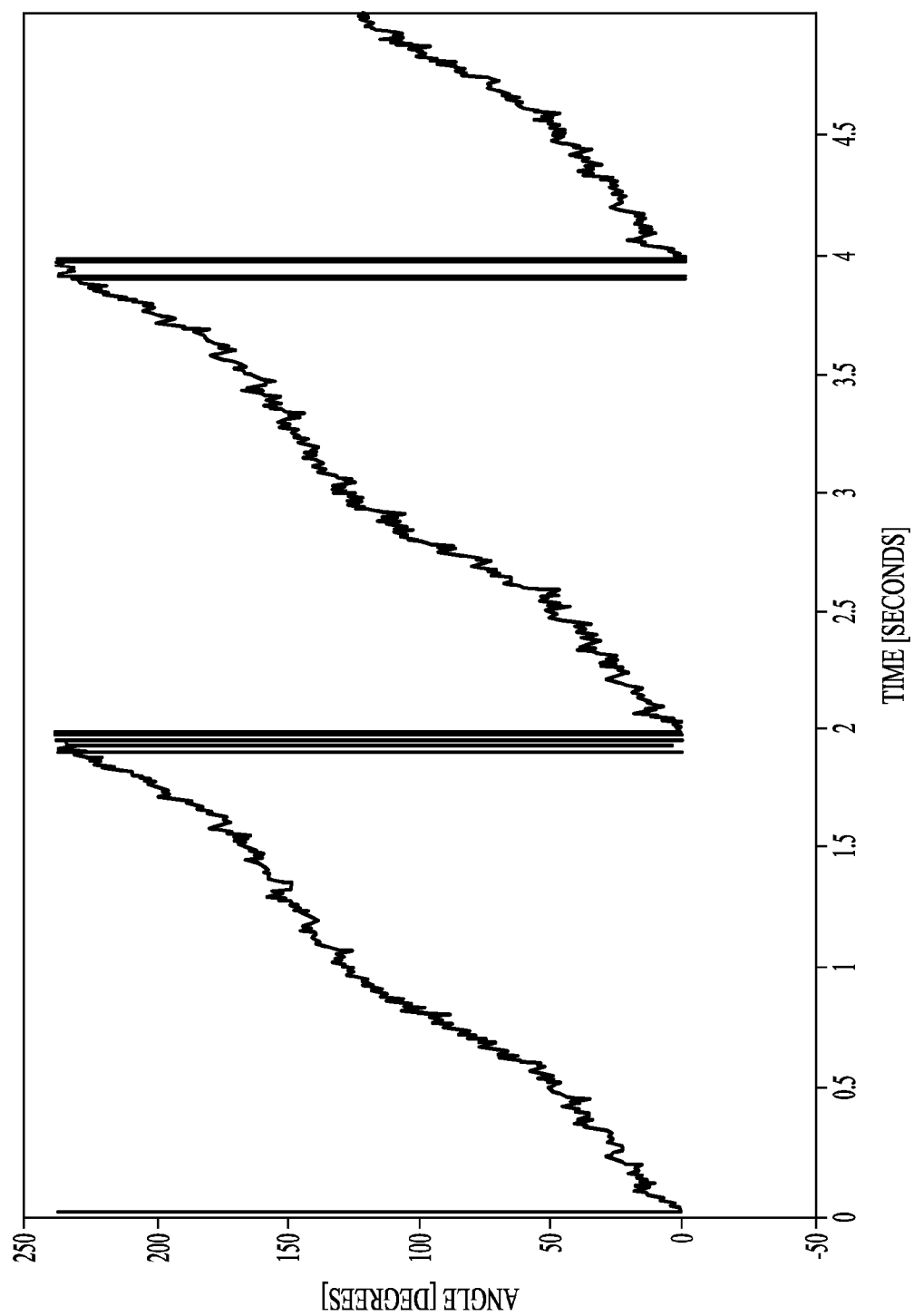
FIG. 6 is a plot of an angular measurement when the signal levels are very low, according to some embodiments.

FIG. 6 is a plot of an angular measurement when the signal levels from the magnetometers are very low, according to some example embodiments. These signal levels can be low when the fields are very weak either due to some shielding effect or sensor orientation relative to the field direction. The horizontal axis is time in seconds. This example includes 5 seconds of data during which 2.5 revolutions occur. Note that the angle value cycles from 0 to 240 and back to 0 as 1 revolution is completed (and further note that the actual angle=the angle value*1.5). The plot illustrates the effect of noise, if an attempt were made to calculate the RPM variation directly from this data. The noise effects would be very significant, causing as much as 50% error in the readings. In general, a stick slip frequency will be less than 5 Hz and the preferred sampling frequency is at least 10 Hz. However, due to the face that there is underling noise in the measurement at frequencies exceeding 100 Hz, the data can beneficially be sampled at a rate much higher than 10 Hz to allow contention with this noise signal. To reduce the noise effects, the data in one example is sampled at 400 Hz, then digitally filtered with a linear phase Finite Impulse Response filter, and then digitally down-sampled to a rate adequate to describe the stick slip frequency.

Figure 7A:
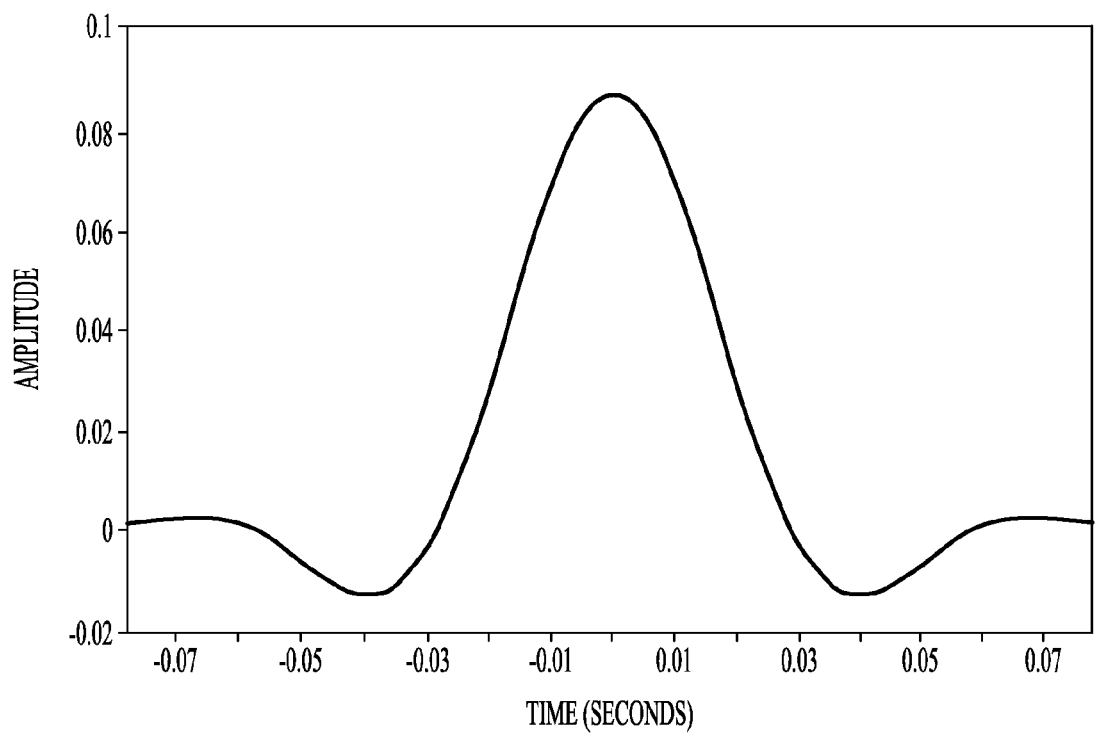
FIG. 7A-B shows the characteristics of the down sampling filter, according to some example embodiments.
Figure 7B:
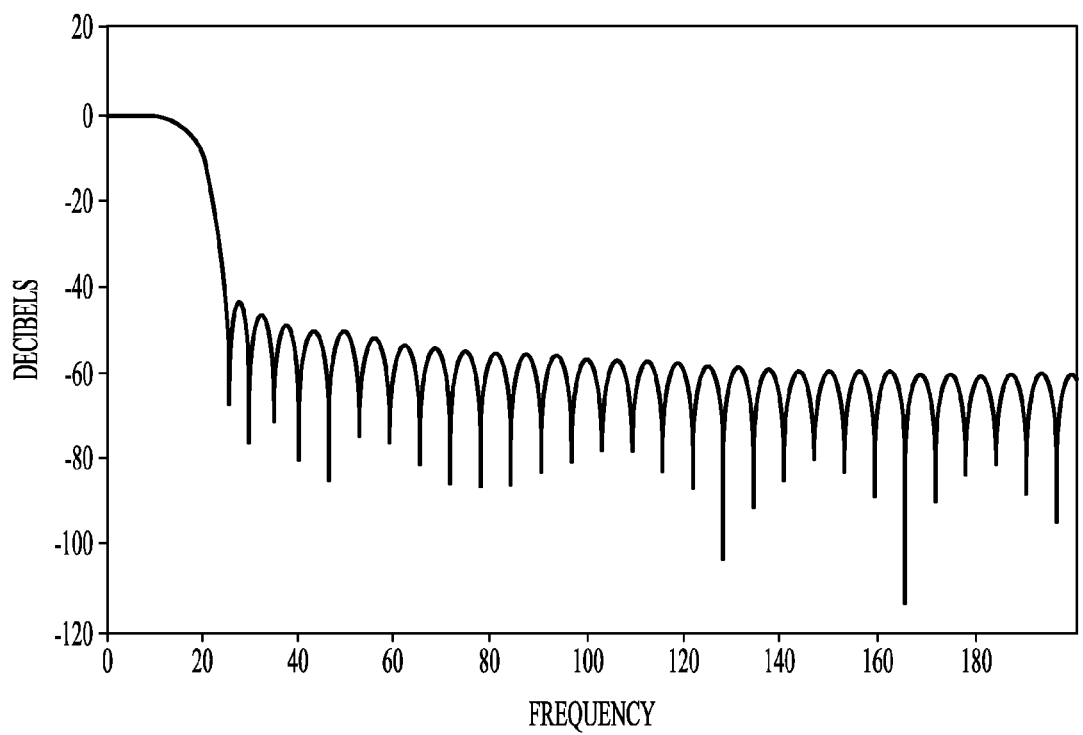

FIGS. 7A-B show the characteristics of the down sampling filter, according to some example embodiments. The down sampling filter is applied to the 400 Hz sampled data. A low pass with a 20 Hz cutoff frequency is then performed. The data is then linearly phased through the pass band (an important characteristic to assure proper description of summed magnitudes for signals in the pass band). In other words, if the stick slip signal consisted of multiple frequencies, it can be important to maintain the relative phase between those frequencies to assure proper magnitude is indicated.

Returning to FIG. 6, another effect of noise is apparent. Some stick slip detection algorithms detect minimum and maximum RPM by measuring the cycle time of the angle detector (e.g., the duration required for the angle detector to cycle from 0 to 240 then cycle back to 0). However, when noise is introduced, this technique can be affected by the toggling appearance of the angle reading at the transition point. This shortcoming of this algorithm is avoided by the RPM variance method, according to some example embodiments.

Figure 8:
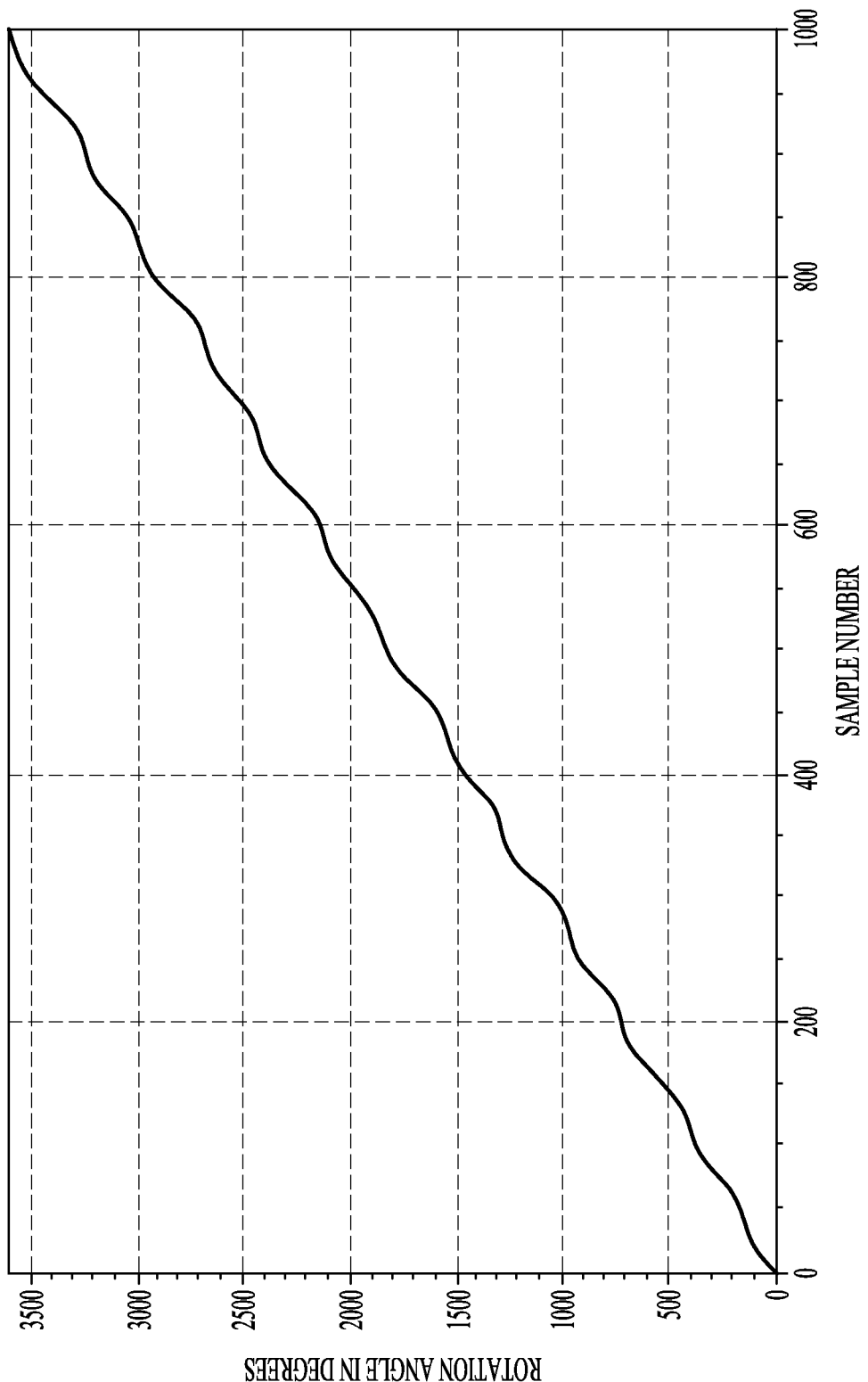
FIG. 8 illustrates the graph of the total angle calculated for a 20 second data window, according to some example embodiments.

FIG. 8 illustrates a graph of the total angle calculated for a 20 second data window, according to some example embodiments. The vertical axis is angle in degrees, while the horizontal axis is sample number at a sample rate of 50 Hz. This data has been filtered then downsampled to a 50 Hz sample rate).

Figure 9:
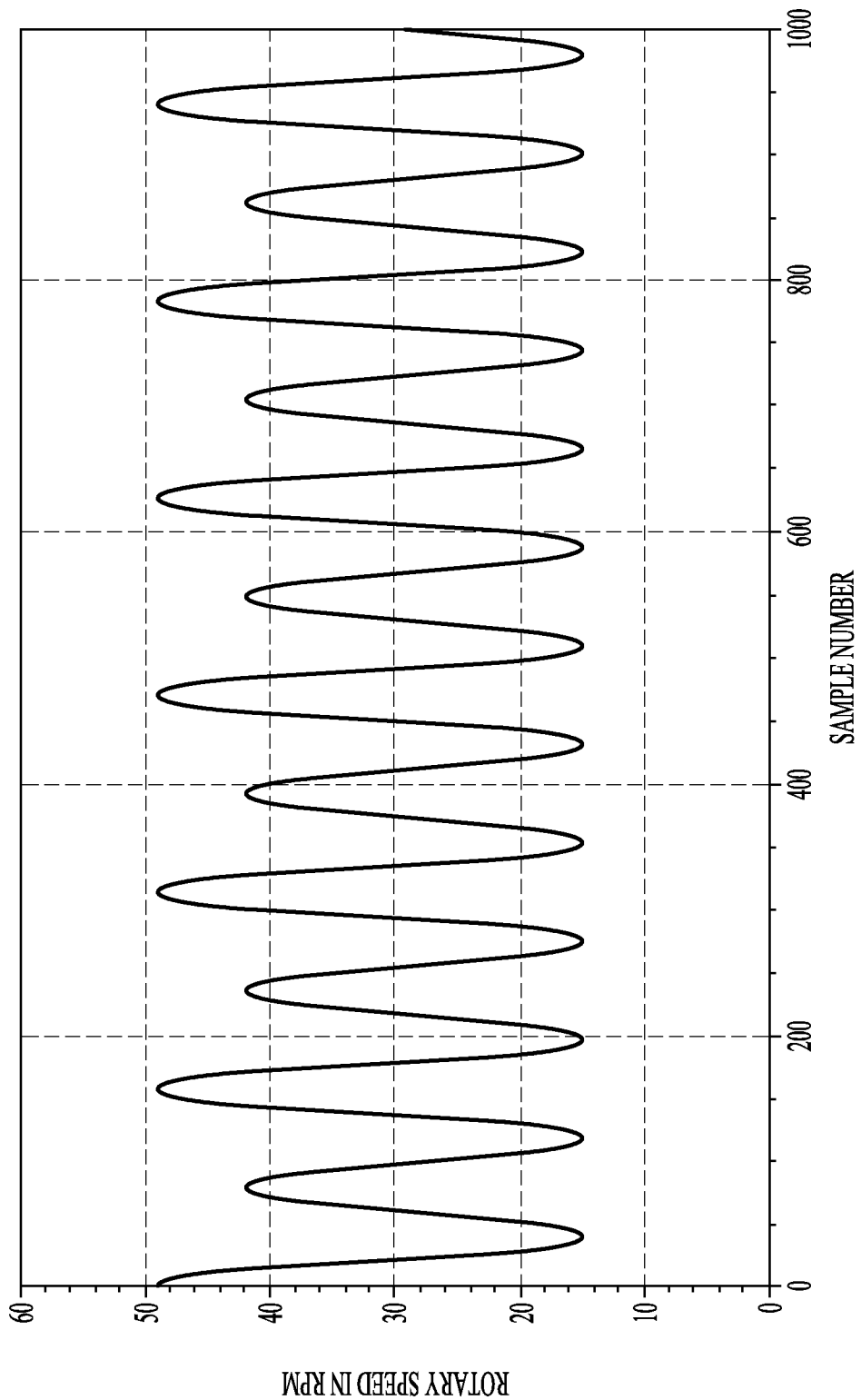
FIG. 9 illustrates a graph of the angular speed per unit of time derived from FIG. 8, according to some example embodiments.

FIG. 9 illustrates a graph of the angular speed in RPM derived from FIG. 8, according to some example embodiments by numerically taking the time derivative of the angular position in FIG. 8. The horizontal axis is the same as for FIG. 8. The vertical axis is in units of RPM. The minimum rotary speed is 15 rpm, the maximum rotary speed is 49 RPM, while the average rotary speed is very close to 30 RPM Fourier techniques can be used to estimate the frequencies that are present, but in order to understand how these frequencies vary with time, frequency resolution must be compromised, often very seriously, to obtain temporal resolution.

In some example embodiments, especially where the signals are noisy, filtering can be avoided yet frequencies can be calculated to a high frequency and temporal resolution if the data from two lateral, cross-axially arranged, magnetometers (data $B_x$ and $B_y$) are used. The output of a properly calibrated pair of cross-axial magnetometers with the same scale factor may be described by $$B_x(t) = A * \sin(\omega(t)*t + \theta)$$

$$B_y(t) = A * \cos(\omega(t)*t + \theta) \quad \text{Eq. 2}$$

in which ω is the angular frequency. Taking the derivative of both components, and then summing the squares of the derivatives:

$$\omega = \frac{\sqrt{\left(\frac{d}{dt}B_x(t)\right)^2 + \left(\frac{d}{dt}B_y(t)\right)^2}}{\sqrt{B_x(t)^2 + B_y(t)^2}} \quad \text{Eq. 3}$$

The derivatives can be taken numerically over short time intervals, allowing rapid frequency estimation. In addition, the denominator of Equation 3 should be a very slowly varying function of time. Hence, a filtered version of this can be used in estimating ω.

Figure 10:
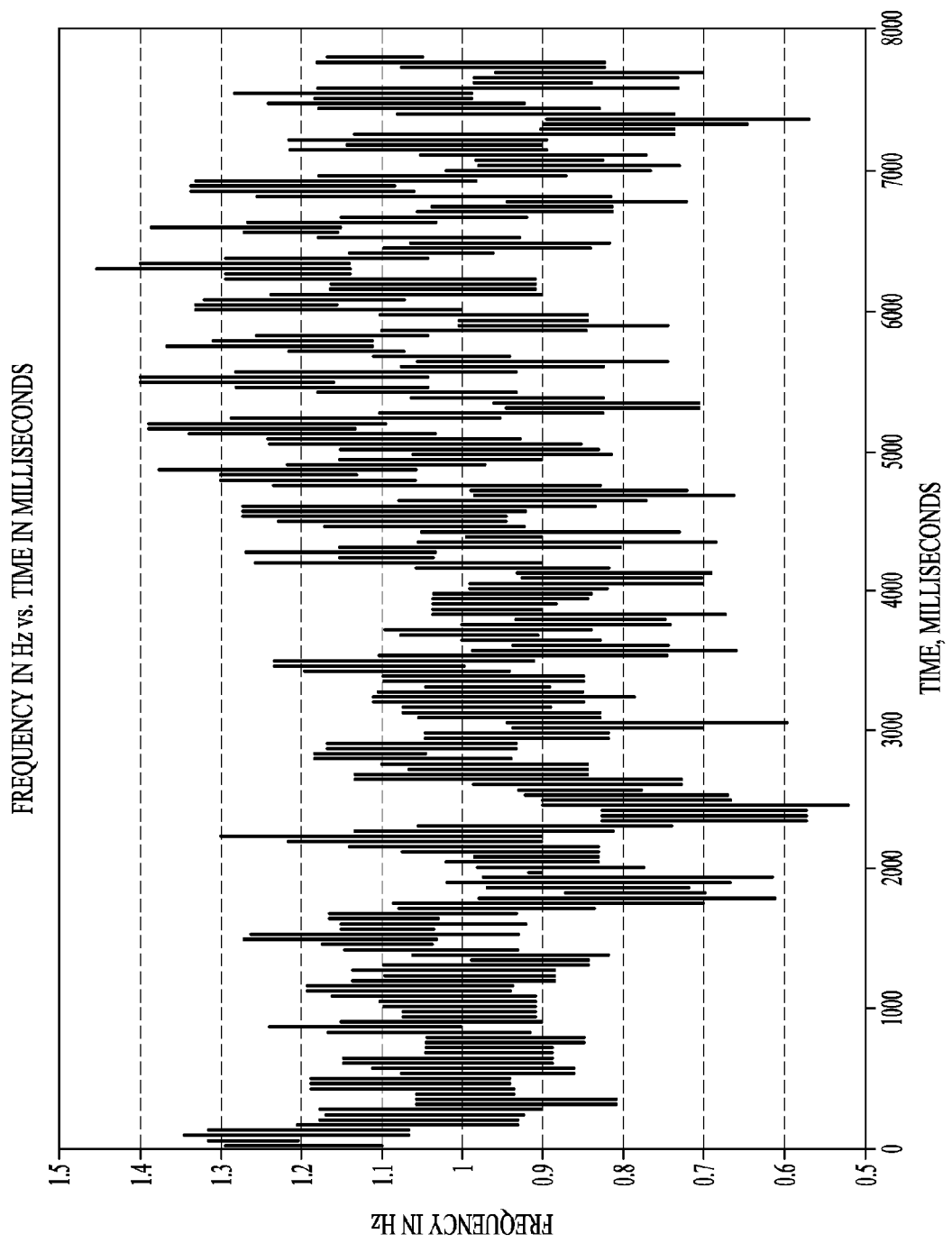
FIG. 10 illustrates a distribution of frequencies, according to some example embodiments.

To illustrate, FIG. 10 illustrates a distribution of frequencies, according to some example embodiments. The magnetometer was sampled at 500 Hz. To obtain a satisfactory angular difference, points 10 samples away were used in calculating the derivative. For this particular signal, the outputs had been normalized so that the amplitude was 1. Hence, there was no division by the amplitude. In addition, a very simple filter was applied to the frequency estimates.

General

In the description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that embodiments of the invention may be practiced without such specific details. In other instances, control structures, gate level circuits and full software instruction sequences have not been shown in detail in order not to obscure the embodiments of the invention. Those of ordinary skill in the art, with the included descriptions will be able to implement appropriate functionality without undue experimentation.

References in the specification to "one embodiment", "an embodiment," an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Some or all of the operations described herein may be performed by hardware, firmware, software or a combination thereof. Upon reading and comprehending the content of this disclosure, one of ordinary skill in the art will understand the manner in which a software program can be launched from a machine-readable medium in a computer-based system to execute the functions defined in the software program. One of ordinary skill in the art will further understand the various programming languages that may be employed to create one or more software programs designed to implement and perform the methods disclosed herein. The programs may be structured in an object-orientated format using an object-oriented language such as Java or C++. Alternatively the programs can be structured in a procedure-orientated format using a procedural language, such as assembly or C. The software components may communicate using any of a number of mechanisms well-known to those skilled in the art, such as application program interfaces or inter-process communication techniques, including remote procedure calls. The teachings of various embodiments are not limited to any particular programming language or environment.

In view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto. Therefore, the specification and drawings are to be regarded in an illustrative rather than a restrictive sense.

What is claimed is:

1. A system comprising:
a drill string having a drill bit, the drill string configured to extend through at least part of a well bore;
a first vibrational sensor positioned on the drill bit to measure, at a first location on the drill string, one or more of an axial vibration and a lateral vibration;
a second vibrational sensor positioned above the drill bit and on the drill string, the second vibrational sensor to measure, at a second location on the drill string, one or more of an axial vibration and a lateral vibration; and
a processor unit configured to determine a type of vibration based on a comparison of the measured vibration at the first location to the measured vibration at the second location, and wherein the comparison comprises comparing the frequencies of the measured vibrations.

2. The system of claim 1, wherein the processor unit is positioned downhole in the drill string, wherein the processor unit is to cause a signal indicative of the determined type of vibration to be transmitted to a surface location.

3. The system of claim 2, wherein the drill string is used in a drilling operation to drill the wellbore, wherein a control unit is to modify the drilling operation based on the determined type of vibration.

4. The system of claim 3, wherein the control unit is to alter rotations per minute of the drill string during the drilling operation.

5. The system of claim 1, wherein the determined type of vibrations comprises bit whirl and bottom hole assembly (BHA) whirl.

6. The system of claim 1, wherein the second vibrational sensor is positioned on a bottom hole assembly in the drill string.

7. The system of claim 1, wherein the first vibrational sensor or the second vibration sensor comprises an accelerometer.

8. The system of claim 1, further comprising a third vibrational sensor positioned above the second vibrational sensor to measure, at a third location on the drill string, one or more of an axial vibration, a torsional vibration and a lateral vibration.

9. The system of claim 1, wherein the compared frequencies of the first and second measurements, comprise a plurality of vibration measurements from each location.

10. An apparatus comprising:
a first multi-axial transducer, located at a drill bit on a drill string, to monitor an amplitude of at least an axial vibration and a lateral vibration at a first location;
a second multi-axial transducer, located a spaced distance above the drill bit, to monitor an amplitude of at least an axial vibration and a lateral vibration at a second location; and
a processor unit to evaluate the two amplitudes, wherein the processor unit is to detect at least one vibration mechanism based on the evaluation of the amplitudes.

11. The apparatus of claim 10, wherein the first multi-axial transducer comprises a first tri-axial transducer and the second multi-axial transducer comprises a second tri-axial transducer.

12. The apparatus of claim 11, wherein the first tri-axial transducer is to monitor the amplitude of the axial vibration, and the amplitude of the lateral vibration at the first location and wherein the second tri-axial transducer is to monitor the amplitude of the axial vibration and the amplitude of the lateral vibration at the second location.

13. The apparatus of claim 12, wherein the processor unit is to determine which of the amplitudes is greater for each of the axial vibration and the lateral vibration.

14. The apparatus of claim 13, wherein the processing unit is to alter a weight on the drill bit during the drilling operation.

15. The apparatus of claim 10, further comprising a telemetry device, wherein the processor unit is to cause the telemetry device to transmit a signal from downhole to the surface that indicates that the at least one vibration mechanism is bit whirl if the amplitude at the first location is at least N percentage greater than the amplitude at the second location.

16. The apparatus of claim 10, wherein the drill string is used in a drilling operation to drill the well bore, wherein a control unit is to modify the drilling operation based on the at least one vibration mechanism.

17. A method comprising:
receiving measurement of at least one of an axial vibration and a lateral vibration from a first transducer positioned at a first location on a drill string near a drill bit thereof;
receiving measurement of at least one of an axial vibration and a lateral vibration from a second transducer positioned at a second location on the drill string a spaced distance above the drill bit;
comparing the measurement for the first location to the measurement for the second location, and further comparing at least one of said measurements to a reference; and
detecting a vibration mechanism on the drill string based on the comparing.

18. The method of claim 17, detecting the vibration mechanism on the drill string comprises detecting bit bounce if a peak acceleration for both measurements for axial vibration is about 40 g or greater.

* * * * *